March 12, 1957  K. M. HALEY ET AL  2,785,063

TEMPERATURE CONTROL SYSTEM AND METHOD

Filed Nov. 17, 1951  3 Sheets-Sheet 1

INVENTORS
Kenneth M. Haley
Harold V. Trask
BY John Healy

Hudson, Boughton,
Williams, David & Hoffmann.
Attorneys

FIG. 3

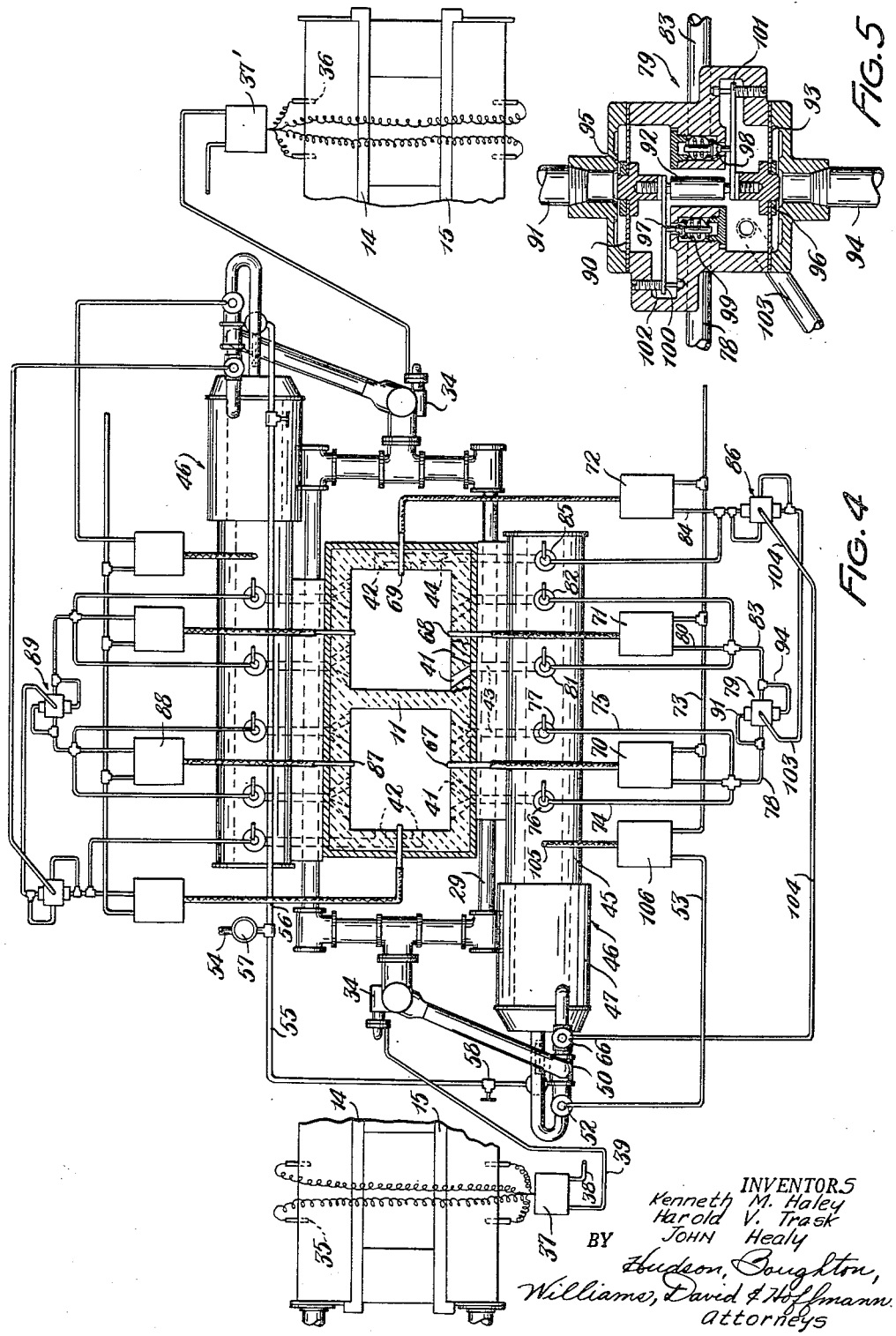

United States Patent Office 2,785,063
Patented Mar. 12, 1957

2,785,063

TEMPERATURE CONTROL SYSTEM AND METHOD

Kenneth M. Haley and Harold V. Trask, Ashland, Ky., and John Healy, Duluth, Minn., assignors to Oglebay, Norton and Company, Cleveland, Ohio, a corporation of Delaware Application November 17, 1951, Serial No. 256,908

17 Claims. (Cl. 75—5)

This invention relates to a temperature control system and method and, more particularly, to a system and method for controlling the supplying of air to a shaft furnace in which discrete bodies of mineral solids are heated.

It has been found that, although many finely divided materials, such as ore oxides and the like, can be agglomerated into discrete bodies by briqueting, pelletizing or balling, and by other procedures, such bodies must be heated to enhance their strength, ruggedness and resistance to impact, weathering and other stresses incident to handling and ultimate use in metallurgical processes. The heating to effect this hardening or increase in strength may, for simplicity, be termed "induration," it being understood that this refers to hardening of the mass of fines consolidated into discrete bodies unaccompanied by any substantial or objectionable fusion between the discrete bodies. By way of specific example, it may be mentioned that finely divided magnetite particles may be agglomerated by moistening and then rolling the particles in a rotating drum to form discrete balls or pellets. These pellets are quite friable but may be very materially hardened by heating them to an elevated temperature in a shaft furnace to which an abundance of air is supplied. The heat for effecting the hardening of the pellets may be entirely supplied from a source externally of the pellets or may be supplied at least in part by fuel incorporated in the pellets at the time of their formation so long as the quantity of fuel thus utilized is insufficient to support a flame when the pellets are heated.

Therefore, an object of the invention is to provide an improved system and method for controlling the flow of heated air to an indurating zone for mineral solids.

Another object of the invention is to provide an improved system and method for controlling the flow of heated air to a shaft furnace in which discrete bodies of mineral solids are being indurated, the air flow being automatically controlled by the temperature of the bodies within the furnace.

A further object of the invention is to provide an improved system and method for indurating discrete bodies of iron ore or other mineral solids by heating the said solids, while in a continually descending mass, to an indurating temperature at a region adjacent the top of the mass, the temperature of the indurating zone being regulated by individual control of the B. t. u. input to contiguous regions of the mass adjacent the indurating zone, while the elevation of said zone is governed by control of air introduced adjacent the bottom of said mass.

A still more specific object of the invention is to provide an improved system and method as defined in the preceding paragraph wherein control of the B. t. u. input to each of the said contiguous regions adjacent the indurating zone is individually effected in response to the temperature of the bodies in that region, while the introduction of air adjacent the bottom of the said mass of solids is controlled by the temperature of the gases issuing from the top of said mass.

Another object of the invention is to provide an improved temperature control system for a shaft furnace adapted to indurate discrete bodies of mineral solids having fuel incorporated therein, characterized by a means externally of said furnace for heating air and for introducing the heated air into said furnace at spaced locations thereabout and adjacent the upper portion of the furnace, the flow of air of each at said spaced locations being controlled by the temperatures of the bodies heated adjacent said locations and the quantity of air supplied to the heating means being controlled by the demand for heated air at the said locations.

Another object of the invention is to provide an improved temperature control system as defined in the preceding paragraph with a means responsive to the temperature of the said heating means for controlling the application of heat thereto.

The invention further resides in certain novel steps of procedure and features of the construction and arrangement of parts of the apparatus, and further objects and advantages of the invention will be apparent to those skilled in the art to which it pertains from the following description of the present preferred embodiment thereof described with respect to the accompanying drawings in which, Fig. 1 is a somewhat schematic side elevational view of a shaft furnace embodying the novel air control system and which may be employed to practice the method of this invention;

Fig. 3 is an end elevational view of the shaft furnace shown in Fig. 1 as seen from the left-hand side of that figure and with the upper portion of the furnace partially broken away to further illustrate the structure;

Figure 1:
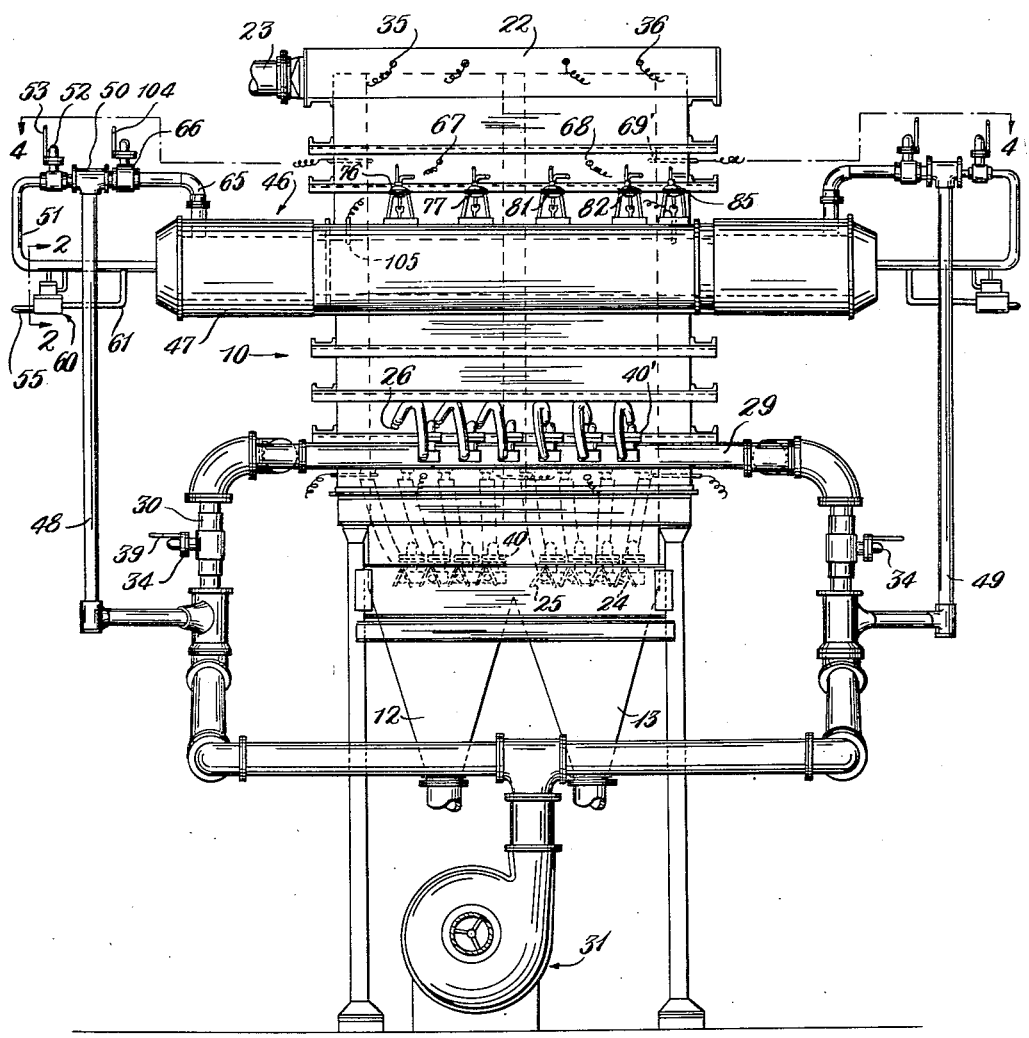

Fig. 4 is a somewhat schematic developed view illustrating the principles of the novel method and system for controlling the flow of air to the furnace, the view being taken principally on the line 4—4 of Fig. 1, to show the air openings and the thermoresponsive members adjacent the indurating zone, and the top of the furnace being broken into two portions and illustrated in plan adjacent either side of the main body of the figure to show the operative relationships of the thermoresponsive members therein with respect to the other controls; and, Fig. 5 is an enlarged sectional view through one of the air relays shown in Fig. 4.

In order to simplify the disclosure and to provide a specific example of one practical manner in which the invention may be practiced, the description will hereinafter refer specifically to indurating pellets of iron ore, such as magnetite, which have been formed by balling the ore while in a moist condition. Such pellets are indurated in a shaft furnace while in the form of a slowly descending mass therein. The heat for effecting the induration is preferably supplied, at least in part, by the incorporation of a small quantity of fuel into the pellets either during or prior to the balling operation and, for this purpose, finely powdered carbonaceous material is highly satisfactory. The quantity of such fuel should, however, be insufficient to support a flame and therefore represents only a few percentum of the total mass of the pellets. In place of solid fuel, liquid fuel may be employed in certain instances.

In accordance with this invention, the air for effecting burning of the fuel in the pellets, and the induration of the latter, is supplied, in two principal streams, one of which is introduced in substantially unheated condition adjacent the bottom of the mass of pellets while the other is heated and introduced at spaced locations about the mass adjacent the indurating zone therein. If desired, a material part of the necessary heat for effecting the induration may be provided by the stream of heated air, thereby reducing, if not entirely eliminating, the need for fuel in the pellets.

Referring now to the drawings, the invention is shown as incorporated in a shaft furnace 10 of substantially rectangular configuration in transverse cross section. This furnace is longitudinally divided into two vertically extending, parallel portions by a central wall 11 extending vertically throughout the entire height of the furnace so as to, in effect, provide two independent shafts within a single shell each terminating in a funnel-like portion, 12 and 13 respectively. The provision of the central division wall 11 is desirable to reduce the cross sectional area of the mass of mineral bodies or pellets, thereby facilitating proper distribution of heat therethrough, while at the same time providing for economy of construction with respect to the shell and associated structures. It is to be understood, however, that the invention is not limited to a furnace thus divided nor even to a furnace of rectangular cross section.

Figure 3:
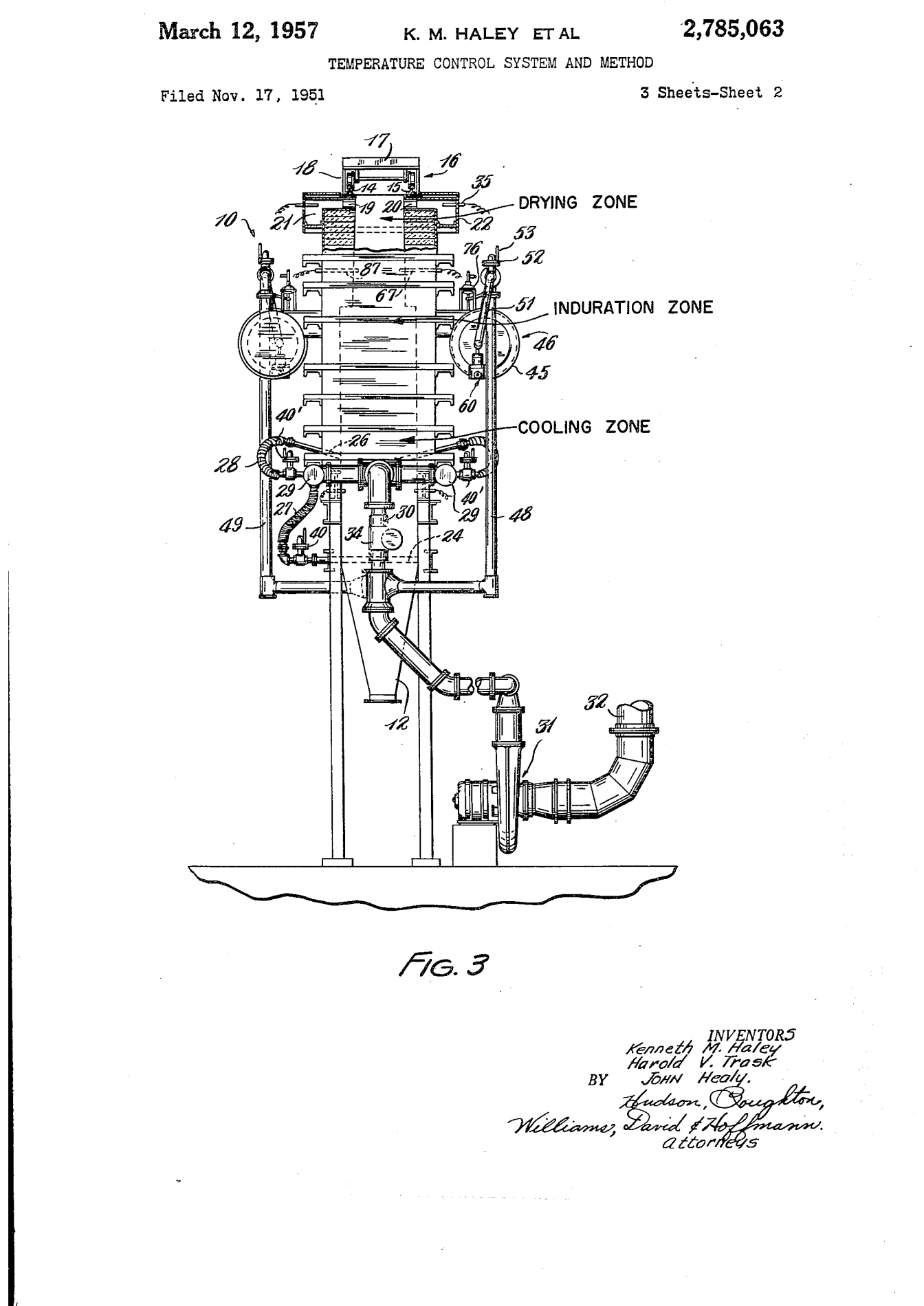

The furnace 10 is adapted to receive as mass or quantity of discrete bodies of mineral solids, such as the previously mentioned balls or pellets of iron ore which preferably have a small quantity of fuel incorporated therein. These bodies or pellets are delivered to the top of the furnace substantially continuously and in a manner providing a substantially level upper surface of the pellets. A corresponding volume of the finished or indurated pellets is removed from the bottom of the furnace through the discharge openings 12 and 13, under control of means not shown, in a manner such that the furnace is maintained substantially full of the pellets at all times, thereby providing a slowly descending mass of substantially uniform height. The charging of the pellets into the top of the furnace may be effected by suitable conveying means, not constituting a part of this invention, which may be provided upon a car or carriage reciprocable above the top of the furnace upon tracks or rails such as 14 and 15 located on either side of the upper opening of the furnace, see Figs. 3 and 4. Preferably this means supplying the material, and which is generally designated 16 in Fig. 3, also includes an imperforate portion 17 which reciprocates with the material supplying means to form a cover for the top of the furnace so that only a small portion of the top of the latter is exposed at any given time. The amount of the opening thus exposed is further reduced by providing the material supplying means 16 with downwardly extending plates 18 which move with the material supplying means and have their lower ends depending into troughs of sand or water to provide a substantially continuous air seal.

Below the rails 14 and 15 the furnace 10 is provided on opposite sides with openings such as 19 and 20 in communication with elongated chambers 21 and 22. The chambers 21 and 22 are provided, adjacent their ends, with suitable conduits, such as 23, which communicate with an air exhaust means, not shown, but which may include a suitable fan and air cleaner. Since the top of the furnace is substantially covered, substantially, all of the air and other gases issuing from the top of the furnace is withdrawn through the chambers 21 and 22. The air thus withdrawn may be allowed to exhaust to the atmosphere, or, after cleaning, a portion thereof may be again utilized in the furnace as hereinafter described.

Adjacent the lower part of the furnace are provided transversely extending pipes 24, see Fig. 1, which are disposed beneath inverted V-shaped guard plates, such as 25, the pipes 24 having spaced openings along their lower sides for emission of air. Vertically spaced above the pipes 24 and inverted V-shaped guards 25, the side walls of the furnace are provided with spaced tuyeres 26 for supplying air to the mass of pellets within the furnace in the lower region thereof. If desired, the pipes 24 and tuyeres 26 may be supplemented by, or replaced by, conduits connected to the hopper-like discharge portions 12 and 13 of the furnace. Also if desired, suitable crusher rolls, not illustrated, may also be provided adjacent the lower portion of the furnace between the pipes 24 and the tuyeres for the purpose of breaking any excessively large clusters of pellets which may form.

The pipes 24 and the tuyeres 26 are connected by suitable conduits 27 and 28 to bustle pipes, such as 29, extending around the furnace and connected adjacent either end of the furnace, with vertically extending pipes 30. The pipes 30 are connected with the output of a blower 31, the input 32 of which is preferably in communication with the atmosphere but may be connected with the previously mentioned cleaner of the air exhausting means for the chambers 21 and 22 to use at least a part of the air and other gases issuing therefrom. Intermediate the blower 31 and the bustle pipes 29, the pipes 30 are each provided with a valve 34 for controlling the amount of air flowing to the pipes 29. In view of the fact that the furnace here illustrated has two separated parallel compartments, the pipes 30 and valves 34 are duplicates and the bustle pipes 29 on opposite sides of the furnace are preferably each provided with a transverse partition wall medially thereof so that the air supplied to the pipes 24 and tuyeres 26 of one chamber or shaft under control of the corresponding valve 34 is independent of the air supplied to the other chamber or shaft under control of the other valve 34. However, since the two vertical chambers or shafts of the furnace are identical, an understanding of the invention requires detailed consideration of the air supply to only one such chamber or shaft.

Located at spaced points within the chambers 21 and 22, adjacent the top of the furnace, are thermoresponsive members preferably in the form of thermocouples 35 and 36 with the members 35 responsive to the temperature of the gases issuing from one chamber or shaft of the furnace and the members 36 responsive to the gases issuing from the other chamber or shaft. The thermocouples 35 are connected with a temperature indicating and/or recording instrument 37 which is adapted to both indicate and/or record the temperature and also control the flow of air supplied to the instrument at a predetermined pressure through a pipe 38. The instrument 37 is of conventional type and may, for example, be similar to that shown in U. S. Patent 2,201,946 to which reference may be had for the details thereof. Suffice it here to note that, upon variation in the temperature of the air or other gas issuing from the top of the furnace, the instrument 37 will correspondingly vary the flow of control air from the inlet pipe 38 to the exit pipe 39 which is connected with the valve 34 thereby controlling the operation of the latter. The other shaft or chamber of the furnace 10 is similarly provided with thermoresponsive members 36 connected to an instrument 37' for control of the operation of the associated valve 34. Consequently, the quantity of air which is supplied to the bustle pipes 29 and hence from the latter to the pipes 24 and the tuyeres 26 is governed by the temperature of the air and other gases issuing from the top of the furnace. The proportion of the total quantity of air, supplied to the bustle pipes, which issues from each individual pipe 24 and tuyere 26 may be separately regulated by air-operated valves 40 and 40', see Fig. 3, which may be manually controlled from a suitable operator's station remote from the furnace.

It will now be apparent that the quantity of air supplied adjacent the bottom of the mass of the discrete bodies or pellets in the furnace, or at points adjacent the bottom of the said mass, is automatically regulated in accordance with the temperature of air and other gases leaving the top of the furnace. Since the elevation of the indurating zone, that is, the region where the maximum temperature is achieved in the furnace for indurating or hardening of the pellets, varies in accordance with the quantity of air supplied adjacent the bottom thereof the elevation of this zone may be controlled by suitable adjustment of the instruments 37 and 37' to provide the desired operation of valves 34 for a given temperature at the top of the furnace. Variations in the temperature of the air and other gases issuing from the top of the furnace will then alter the response of the instruments 37 and 37' so that they will correspondingly vary the flow of the control air through the conduits 39. This in turn varies the opening of the valves 34, thus supplying air to the furnace in sufficient quantity so that the indurating zone rises or lowers as the case may be, to maintain the said zone at the optimum location.

The optimum indurating zone is adjacent the top of the furnace, but spaced slightly below the top level of the bodies or pellets therein. The heat necessary for effecting the indurating may be supplied at least in part by fuel within the solids or pellets and in part by heated air introduced into the furnace. This heated air, either alone or in combination with the heat produced by the combustible material in the pellets when contacted by the heated air, determines the temperature of the indurating zone and must be closely regulated in order to provide a product of the desired hardness without, however, objectionable fusing of the pellets into large clinkers or fused masses. For this purpose the side and end walls of the furnace are provided with spaced openings or ports such as 41, 42, see Fig. 4. These ports 41, 42 are all at substanially the same elevation and are preferably in spaced pairs with each pair united with a single conduit or passage, such as 43 and 44, respectively, leading to a supply conduit or main 45 of an air heating means, generally designated 46. Preferably, two air heating means 46 are provided, one adjacent either side of the furnace and half of the ports 41, 42 are connected to one of these heating means, while the other half of these ports are connected with the other heating means, as will be readily apparent in Fig. 4. For convenience, all the ports 41 on one side of the furnace are shown connected to the same heating means even though certain of these ports are in one chamber or shaft and others are in the other shaft. If desired, however, the connections to the ports may be so arranged that all the ports 41, 42 for a given chamber or shaft are connected to one of the heating means with all the ports 41, 42 for the other shaft connected to the other heating means.

The heating means 46 may be of any suitable construction but preferably is adapted to utilize fluid fuel, burning the latter in a combustion chamber 47 and then mixing the products of combustion with air introduced therein in a manner such as to have a swirling action and effect proper mixing and heat exchange. The mixed products of combustion and heated air then flow through the main 45 and the conduits such as 43, 44 to the ports 41, 42 thus entering the furnace adjacent the upper portion of the mass of bodies or pellets therein.

Air for supporting combustion, as well as the air which is heated as a result of the combustion, is supplied to the heating means 46 from the blower 31 through conduits 48 and 49 connected with the conduits 30 between the valves 34 and the blower 31. The conduits 48, 49 are provided one at either end of the furnace and they, together with the associated heating means, are identical. Each conduit 48, 49 terminates, adjacent the associated heating means 46, in a T 50 and from each T a pipe or conduit 51 is connected to the end of the combustion chamber 47, the pipe 51 providing the air for supporting combustion and hence will hereinafter be called the primary air. Between the T 50 and the conduit 51 is interposed a valve 52 which is operated by a flow of control air supplied through a pipe 53 as hereinafter described.

The fuel for the combustion chambers 47 is in fluid form, preferably gas, supplied from a suitable main through a conduit 54, see Fig. 4, which is connected with conduits 55 and 56 leading to the combustion chambers 47. A suitable pressure regulator 57 may be provided intermediate the supply conduit 54 and the branch conduits 55, 56 and each of the latter may be provided with suitable regulating valves such as 58 and/or automatic cutoffs incorporating the usual safety features, as will be readily understood and which are not here illustrated in detail. The flow of gas or other fluid fuel to each of the combustion chambers 47 is controlled in accordance with the supply of primary air to the chamber and since both chambers and controls are identical only one will be described.

Figure 2:
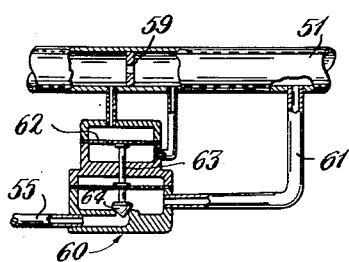
Fig. 2 is a fragmentary view to an enlarged scale of the fluid fuel control mechanism, the view being principally in longitudinal section taken substantially on the line 2—2 of Fig. 1.

The conduit 51 is provided with an orifice plate 59 or venturi throat, see Fig. 2, the pressure differential across which operates a conventional pressure responsive valve, generally designated 60, to control the flow of fuel from the conduit 55 to a conduit 61 which is in turn connected with the conduit 51 adjacent its entrance into the combustion chamber. Thus, as shown in Fig. 2, the valve 60 has chambers on opposite sides of a diaphragm 62 with the chambers respectively communicating with the conduit 51 on opposite sides of the orifice plate 59 so that a change in flow of air through the conduit 51 correspondingly varies the position of the diaphragm 62. The diaphragm 62 is connected with a plunger or operating rod 63 provided with a valve 64 for controlling the aforementioned flow of gas or other fuel to the pipe or conduit 61.

The T 50 on the air supply conduit 48 is also connected with the heating means 46 by a pipe 65 to thereby supply air for heating by the combustion chamber which air is also mixed with the products of combustion and then supplied to the furnace through the ports 41, 42. This air, which for convenience is called the secondary air, is controlled by a valve 66 which is operated by a controlled air pressure varied in accordance with the temperature of the pellets adjacent the ports 41, 42. As shown in Fig. 4, this is achieved by providing a plurality of thermoresponsive members, such as thermocouples 67, 68 and 69 adjacent the ports, there being also a thermocouple, such as 67 or 68, between each pair of spaced ports or openings 41 and a similar thermocouple 69 between the spaced ports or openings 42 in the end walls of the furnace. The thermocouple 67 is connected with a temperature indicating and/or recording instrument 70 which also alters a flow of control air, the instrument 70 being of the same type as the aforementioned indicating and control instrument 37. Similarly the thermocouple 68 is connected to an indicating and control instrument 71 and the thermocouple 69 is connected with an indicating and control instrument 72.

The instrument 70 is adapted to alter the flow of air coming from the control air supply conduit 73 so that the pressure of the control air flowing from the instrument 70 is varied in accordance with the temperature of the region adjacent the thermocouple 67. This controlled air pressure is then applied through pipes 74 and 75 to operate valves 76 and 77 controlling the B. t. u. input to the region adjacent the thermoresponsive member 67 by regulating the heated air flowing through the conduits, such as 43, leading from the heating means 46 to the ports 41 adjacent the thermoresponsive member 67. This same controlled air pressure is also applied through a pipe 78 to an air relay, generally designated 79. In the same manner, the temperature adjacent the thermocouple 68 provides a correspondingly regulated air pressure through the pipe 80 for operation of the valves 81 and 82 and for application through a pipe 83 to the air relay 79. Likewise, the thermocouple 69 and instrument 72 regulate a control air pressure in accordance with the temperature adjacent the thermocouple and supply this control air to the conduit 84 operatively connected to the valve 85 and to an air relay 86. Consequently, the B. t. u. inputs adjacent the indurating zone in the form of heated air flowing from the heating means 46 through the spaced conduits or ducts 43, 44 are regulated by the valves 76, 77, 81, 82 and 85 in accordance with the temperatures of the bodies in each of the contiguous regions adjacent the ports communicating with these conduits. The B. t. u. inputs to the indurating zone from the other heating means 46 are similarly controlled by thermocouples such as 87, temperature indicating and control instruments 88 and air relays 89 which are connected and operate in the same manner and hence will not be described in detail.

Referring now to Fig. 5, it will be seen that each of the air relays such as 79, 86 or 89 is provided with a first diaphragm 90 and that one of the control pressure conduits, such as 78, is connected to communicate with the region on one side of this diaphragm by means of a branch pipe 91. Connected with the diaphragm 90 is a rod or plunger 92 which is also connected with a second diaphragm 93 forming one side of a region or chamber provided with a pipe 94 communicating with a second control pressure pipe such as 83. The diaphragms 90 and 93 each carry a valve member or portion such as 95, 96, respectively, for cooperation with an adjacent valve seat for alternate control of the pipes 91 and 94, the construction being such that when the pressure entering through the pipe 91 exceeds that entering through the pipe 94 the valve 95 is opened and the valve 96 is closed.

The control pressure pipe or conduit 78 is connected, through a port in the side of the relay 79, to a chamber controlled by a valve 97 while the pressure conduit 83 is connected, through a port in the side of the relay casing, to a similar chamber controlled by a valve 98. The valves 97 and 98 are both located intermediate the diaphragms 90 and 93 and are normally urged to closed positions by springs such as 99. The outer ends of the valves 97, 98 each bear against a lever 100, 101, respectively, intermediate the ends thereof with each lever fulcrumed adjacent one end by means of an adjusting screw, such as 102, and the other end of each lever connected with the central plunger or member 92. In addition it will be seen that the space intermediate the diaphragms 90 and 93 is in constant communication with a pipe 103.

The construction of a relay such as 79 is such that, when the fluid under pressure entering through the pipe 91 is greater than that entering through the pipe 94, the valve 95 is unseated and the valve 96 is seated, as previously mentioned. This unseating of the valve 95 acts, through the lever 100, to open the valve 97 so that the fluid under pressure corresponding with that entering through the conduit 91 can now pass from the pipe 78 through the now open valve 97 into the chamber between the diaphragms 90 and 93 and thence through the pipe 103. Conversely, when the pressure through the pipe 94 exceeds that through the pipe 91, valve 95 is closed and valve 96 is opened. This actuates the lever 100 so that the spring 99 now closes the valve 97 while the lever 101 unseats the valve 98. Hence, fluid under pressure from pipe 83 now enters into the chamber between the diaphragms 90 and 93 and is thus supplied to the pipe 103. It will therefore be apparent that whichever conduit 78 or 83 has the greater fluid pressure therein will transmit this air pressure to the conduit 103.

The fluid under pressure transmitted through the relay 79 is applied through the pipe 103 to the one portion of the relay 86 while the fluid under pressure resulting from the operation of the measuring and control instrument 72 is applied to the other portion of the relay 86. This relay acts in the same manner, as just described for relay 79, to transmit the greater of the two fluid pressures therethrough to the pipe 104 which is connected with the valve 66 in the secondary air pipe or conduit 65. Consequently, the valve 66 will be opened in accordance with the greatest air pressure existing in any of the pipes, such as 74, 75, 80, 84 leading to the valves controlling the flow of the heated air through the ports 41, 42. While three thermocouples and associated instruments and two air relays have been shown and described for each heating means 46, it will be apparent that a greater or lesser number of these devices may be employed.

Within the conduit or main 45 of the heating means 46 is a thermocouple or other temperature responsive means 105 which is connected with a temperature indicating and controlling member 106 similar to the aforementioned instruments such as 37 and which controls the flow of the metered air pressure through the conduit or pipe 53 leading from the instrument 106 to the primary air valve 52. Consequently, when the temperature of the heated air being supplied to the ports 41 and 42 varies, this variation operates through the thermocouple 105 and instrument 106 to alter the control air pressure in the conduit 53 thus correspondingly varying the setting of the valve 52 and thereby varying the supply of primary air to the combustion chamber 46. The flow of the primary air then operates, as previously described, through the flow responsive valve 60 to correspondingly vary the supply of fluid fuel so that the proper combustible mixture is maintained.

In brief summary of the above, it will be noted that a change in temperature adjacent any of the ports 41, 42 in the region of the indurating zone of the furnace will correspondingly alter the adjacent valves supplying heated air to the furnace. Moreover, when the demand for such heated air varies materially, the temperature within the conduit or main 45 of the heating means will correspondingly vary, thus altering the supply of primary air which, in turn, alters the rate of supply of fuel.

By way of example, but without limitation thereto, one embodiment of the invention employs valves such as 76, 77, 81, 82 and 85 which will open to their maximum position when supplied with control air under a pressure in the order of 9 lbs./sq. in. The pressure of the metered control air supplied to the instruments such as 70, 71 and 72, however, is greater than 9 lbs./sq. in. During the normal operation of the furnace, the temperatures of the pellets adjacent the indurating zone will be such that the instruments 70, 71 and 72 will provide control air under pressures of less than 9 lbs./sq. in. so that none of the valves 76, 77, 81, 82, and 85 will operate to fully open position. When the temperature adjacent one of the thermocouples 67, 68 or 69 drops to a point such that more heat is required, the corresponding instrument such as 70 will provide a greater pressure of control air to the associated valves such as 76, 77 increasing the extent of opening of the latter. If the demand for heat results in the instrument 70 providing a control air pressure equal to or in excess of 9 lbs./sq. in., the corresponding valves 76 and 77 will be opened their maximum amounts. This control air pressure is also transmitted to the relay, such as 79 and acts on the diaphragm 90 thereof. If at the same time the temperature adjacent the thermocouple 68 is such that the valves 81 and 82 need only be partially open the control air pressure supplied by the instrument 71 will be less than that supplied by instrument 70 and will be less than 9 lbs./sq. in. Consequently, the pressure on diaphragm 90 of the relay 79 will exceed that on diaphragm 93 so that valve 97 will be opened transmitting the higher pressured control air to the relay 86. If the temperature adjacent the thermocouple 69 is proper and the valve 85 is not fully open, the relay 86 will transmit the excessive air pressure from instrument 70 to the valve 66, thus increasing the opening of the latter to admit more secondary air to the combustion chamber 47. This will in turn cause a cooling adjacent the thermocouple 105 which will then operate through the control instrument 106 to apply operating air of higher pressure to the valve 52 in the primary air conduit. Hence, more primary air is supplied and this, in turn, acts through the flow responsive valve 60 supplying a corresponding increased quantity of fuel to the combustion chamber.

It will be evident from the construction just described that the secondary air valve 66 may respond to the greatest demand for heated air from any of the ports adjacent the indurating zone. However, the valve 66 is preferably thus further opened only when one or more of the valves such as 76 is fully opened. This may be effected by adjusting the valve 66 so that it has a predetermined minimum opening for control pressures less than 9 lbs./sq. in., which minimum opening supplies sufficient secondary air for all of the ports when none of the latter has reached its fully open position.

It is believed that the operation of the apparatus and the steps of the procedure will now be fully apparent from the above detailed description of the present preferred embodiment of the invention. However, the operation may be briefly summarized as follows. The mineral bodies to be indurated, and which preferably are pellets of iron ore having a small percentage of fuel incorporated therein, are charged into the top of the furnace 10 in a manner providing a substantially uniform distribution of the bodies. Substantially simultaneously, finished bodies or pellets are removed from the bottom of the furnace through the discharge openings 12 and 13, the rates of discharge and of charging being such that the mass of bodies or pellets within the furnace is maintained at a substantially constant elevation and with the individual bodies or pellets substantially constantly descending. During the descent of the bodies or pellets within the furnace, they move into the indurating zone which is adjacent to but spaced below the top of the furnace and in this zone the bodies or pellets are heated to an indurating temperature, the necessary heat being supplied in part by the fuel within the bodies or pellets and in part by heated air entering the furnace adjacent the indurating zone through the ports such as 41, 42. At the same time unheated air is introduced through the lower portion of the mass of bodies or pellets, by means of the pipes 24 and tuyeres 26, and rises therethrough, this air being heated by the bodies or pellets during its ascent. The heated air and other gases rising from the indurating zone are utilized to thoroughly dry the newly charged pellets and elevate the temperature of the latter in preparation for their subsequent induration. As a greater quantity of air is supplied to the bottom of the furnace a greater amount of pellets are required to raise the temperature to that of induration. This gives a greater depth to the cooling zone and so the induration zone is moved up in the furnace. Likewise this greater amount of gases delivers more heat than was previously delivered to the top drying zone and so the gases leave the top of the furnace at a higher temperature. The air and other gases issuing from the top of the mass of bodies or pellets are removed from the top of the furnace through the chambers 21 and 22 and, after cleaning, are either exhausted or part thereof recirculated through the furnace by directing it to the inlet 32 of the blower 31.

The temperature of the air and other gases flowing from the top of the furnace acts through the thermocouples 35, 36 and the instruments 37, 37' to regulate the opening of the valves 34, thus regulating the quantity of air supplied to the bodies or pellets adjacent the bottom of the furnace. This, in turn, determines the elevation of the indurating zone within the furnace, which is thus maintained within close limits by operation of the said thermocouples and control instruments 37. The temperature of the indurating zone is controlled by the temperature and quantity of the heated air introduced through the ports such as 41 and 42, the quantity and temperature of which air is controlled by the thermocouples such as 67, 68, 69 and 87 adjacent the indurating zone. These thermocouples operate, as previously described, to alter the flow of secondary air in accordance with demand for heat, and the corresponding change in temperature of the heated air due to alterations in its flow automatically operates to vary the supply of primary air and fluid fuel to the combustion chambers, thus altering the quantity of heat supplied.

While a preferred embodiment of the temperature control procedure and system has been specifically described and illustrated with respect to indurating discrete bodies of iron ore having fuel incorporated therein, it will be apparent that bodies of other materials may be indurated and variations may be made in certain steps of the procedure and in arrangements of the apparatus without departing from the principles of the invention. Thus, under certain conditions, it is possible to supply the major or entire heat necessary for the induration through the ports adjacent the indurating zone. Also, it is not necessary that the secondary air valve 66 have a minimum position and be varied only above this minimum position by changes in demand as evidenced by the control instruments such as 70, 71 and 72. Also, means other than the air relays specifically shown and described may be employed for transmitting the desired control pressure to the secondary valve 66 for operating the latter in accordance with the variations in demands for heated air. Furthermore, a separate air heating means may be provided for each of the contiguous regions adjacent the indurating zone and separately controlled by the temperature of the bodies in that region. Finally, it will be apparent that the invention is not limited to indurating pellets or balls of iron ore but may be employed for treating other discrete bodies which are gas-permeable when placed in a column within a shaft furnace.

In view of the possible variations in the construction of the apparatus and steps of procedure, certain only of those which have been mentioned above, it is to be understood that the invention is not to be considered as restricted to the exact details, which have been illustrated and described in disclosing the present preferred embodiment of the invention, but only as required by the spirit and scope of the appended claims.

Having thus described the invention, we claim:

1. In a temperature control system for the indurating zone of a shaft furnace adapted to indurate discrete bodies of mineral solids, means externally of said furnace for heating a stream of air to a predetermined temperature, conduit means for supplying said heated air to said furnace at spaced locations thereabout in the region of said indurating zone, separate valve means in each conduit means controlling the flow of air from said heating means to each of said spaced locations, means continuously supplying unheated air in a stream to said heating means, valve means controlling the flow of said unheated air to the said heating means, and means responsive to operation of the first-mentioned valve means for controlling the operation of the second-mentioned valve means.

2. In a temperature control system for the indurating zone of a shaft furnace adapted to indurate discrete bodies of mineral solids, means externally of said furnace for heating a stream of air to a predetermined temperature said means including provision for supplying fuel and primary air to sustain combustion of the fuel, conduit means for supplying said heated air to said furnace at spaced locations thereabout in the region of said indurating zone, separate valve means in each conduit means controlling the flow of air from said heating means to each of said spaced locations, means continuously supplying unheated air in a stream to said heating means, valve means controlling the flow of said unheated air to the said heating means, means responsive to operation of the first-mentioned valve means for controlling the extent of opening of the second-mentioned valve means, and means responsive to the temperature of said heated air in said air heating means for controlling the supply of fuel and primary air to said heating means for combustion.

3. In a temperature control system for the indurating zone of a shaft furnace adapted to indurate discrete bodies of mineral solids, means for heating a stream of air and supplying said heated air to said furnace at spaced locations thereabout in the region of said indurating zone, separate valve means controlling the flow of air to each of said spaced locations respectively, and a plurality of temperature responsive means in said furnace adjacent said spaced locations and operatively connected with the adjacent ones of said valve means for controlling the latter, whereby the temperature of said indurating zone is regulated by individual control of supply of heat to the contiguous regions thereof.

4. In a temperature control system for the indurating zone of a shaft furnace adapted to indurate discrete bodies of mineral solids, means for heating a stream of air and supplying said heated air to said furnace at spaced locations thereabout in the region of said indurating zone, separate valve means controlling the flow of air to each of said spaced locations respectively, a plurality of temperature responsive means in said furnace adjacent said spaced locations and operatively connected with the adjacent ones of said valve means for controlling the latter, means for supplying a stream of air to the lower portion of said furnace, means responsive to the temperature of gases issuing from the top of the furnace, and means operatively connected to the last-mentioned means for controlling the said air supplied to the lower portion of the furnace, whereby the height and the temperature of the indurating zone are automatically maintained at preselected values.

5. In a temperature control system for a shaft furnace, means externally of said furnace for heating a stream of flowing air to a predetermined temperature, valve means for regulating the flow of air to said heating means, means for supplying said heated air to said furnace at spaced locations thereabout, separate valve means for regulating the flow of air from said heating means to each of said spaced locations, means responsive to the temperature in said furnace adjacent said spaced locations and operatively connected with the second-mentioned valve means for controlling the extent of opening thereof, and means responsive to operation of the second-mentioned valve means for controlling the operation of said first-mentioned valve means.

6. In a temperature control system as defined in claim 5, means for supplying unheated air to said furnace adjacent the lower portion thereof, means responsive to the temperature of the air flowing from the top of the furnace, and means responsive to the last-mentioned means for controlling the supplying of said unheated air to the furnace.

7. In a temperature control system for a shaft furnace, means externally of said furnace for heating a stream of flowing air to a predetermined temperature said means including provision for supplying fuel and primary air to sustain combustion of the fuel, valve means for regulating the flow of air to said heating means, means for supplying said heated air to said furnace at spaced locations thereabout, separate valve means for regulating the flow of air from said heating means to each of said spaced locations, means responsive to the temperature in said furnace adjacent said spaced locations and operatively connected with the second-mentioned valve means for controlling the extent of opening thereof, means responsive to operation of the second-mentioned valve means controlling the operation of said first-mentioned valve means, and means responsive to temperature of said heated air for regulating the supplying of fuel and primary air to the said heating means for combustion.

8. In a temperature control system for a shaft furnace, a combustion chamber externally of said furnace for heating a quantity of flowing air to a predetermined temperature said means including provision for supplying fuel and primary air to sustain combustion of the fuel, valve means for regulating the flow of air to said chamber, means for supplying said heated air to said furnace at spaced locations thereabout, separate valve means for regulating the flow of air from said chamber to each of said spaced locations, means responsive to the temperature in said furnace adjacent said spaced locations and operatively connected with the second-mentioned valve means for controlling the extent of opening thereof, means responsive to operation of the second-mentioned valve means for controlling the operation of said first-mentioned valve means, means responsive to temperature of the air heated in said combustion chamber for regulating the supplying of primary air to the combustion chamber, and means responsive to the rate of supply of said primary air for controlling the supply of fuel fed to said combustion chamber.

9. In a temperature control system for the indurating zone of a shaft furnace adapted to indurate discrete bodies of mineral solids, a combustion chamber externally of said furnace, means for separately introducing primary air and fluid fuel into said combustion chamber, means responsive to the flow of said primary air for controlling the supply of fluid fuel fed to said chamber, means for continuously introducing secondary air to be heated into said combustion chamber, means responsive to the temperature of said heated air from said combustion chamber for controlling the flow of primary air to said chamber, conduit means connected to said combustion chamber for conducting the heated air into said furnace at spaced locations thereabout in the region of said indurating zone, separate valve means in each conduit means for controlling the flow of air from said combustion chamber to each of said spaced locations, valve means controlling the flow of unheated secondary air to the said combustion chamber, and means responsive to operation of any of the first-mentioned valve means to maximum open position for increasing the opening of said second-mentioned valve means beyond a predetermined minimum amount.

10. In a temperature control system for a shaft furnace, means externally of said furnace for heating a stream of flowing air to a predetermined temperature, fluid operated valve means for regulating the flow of air to said heating means, means for supplying said heated air to said furnace at spaced locations thereabout, separate fluid operated valve means for regulating the flow of air from said heating means to each of said spaced locations, a plurality of temperature responsive means disposed adjacent said spaced locations in said furnace, means connected with said temperature responsive means providing valve operating fluid pressures in accordance with the temperatures of said temperature responsive means, means for applying the said fluid pressures to the corresponding ones of said second-mentioned valve means for effecting operation thereof, and means for transmitting the maximum of said fluid pressures to the first-mentioned valve means.

11. In a temperature control system for the indurating zone of a shaft furnace adapted to indurate discrete bodies of mineral solids, a combustion chamber externally of said furnace, means for separately introducing primary air and fluid fuel into said combustion chamber, means responsive to the flow of said primary air for controlling the supply of fluid fuel fed to said chamber, means for continuously introducing secondary air to be heated into said combustion chamber, means responsive to the temperature of said heated air from said combustion chamber for controlling the flow of fuel to said chamber, means connected to said combustion chamber for conducting the heated air into said furnace at spaced locations thereabout in the region of said indurating zone, separate valve means for controlling the flow of air from said combustion chamber to each of said spaced locations, a plurality of temperature responsive means in said furnace in the region of said spaced locations and operatively connected with the adjacent valve means to control the latter, valve means controlling the flow of secondary unheated air to the said combustion chamber, and means responsive to operation of the first-mentioned valve means for controlling the opening of said second-mentioned valve means.

12. In a temperature control system as defined in claim 11, means for supplying unheated primary air to said furnace adjacent the lower portion thereof, means responsive to the temperature of the air flowing from the top of the furnace, and means responsive to the last-mentioned means for controlling the supplying of said unheated primary air to said furnace.

13. The process of controlling the temperature in a shaft furnace which comprises thermally enriching a flowing stream of air to a predetermined temperature in a heating zone externally of the furnace, introducing the heated air into said furnace at spaced locations adjacent the upper portion thereof, measuring the temperature in said furnace at spaced locations in said region, individually varying the flow of said heated air to each of said spaced locations in accordance with the temperature measurement adjacent that location, varying the volume of air flowing to said heating zone in accordance with variations in demand for heated air adjacent the said locations, and varying the quantity of heat supplied to said external heating zone in accordance with the temperature of the heated air leaving the said zone.

14. The process of indurating in a shaft furnace discrete bodies of mineral solids which comprises: establishing a descending column of bodies of the solids in a gas traversable mass by charging initially substantially unheated bodies into the top of the furnace and discharging a corresponding volume of the heat treated bodies from the bottom at a rate such that the height of the mass of bodies in the furnace remains substantially constant; thermally enriching flowing air externally of the mass; introducing the heated air into said mass at spaced locations adjacent the upper portion of the mass and at substantially the same elevations thereby creating an indurating zone in the region of said spaced locations; measuring the temperature of said mass at spaced locations in said region; and individually varying the B. t. u. input to said mass at each of said spaced locations in accordance with the temperature measurement adjacent that location thereby maintaining the temperature of said zone at a preselected value by individual control of the temperatures of contiguous areas thereof.

15. The process of indurating in a shaft furnace discrete bodies of mineral solids which comprises: establishing a descending column of bodies of the solids in a gas traversable mass by charging initially substantially unheated bodies into the top of the furnace and discharging a corresponding volume of the heat treated bodies from the bottom at a rate such that the height of the mass of bodies in the furnace remains substantially constant; thermally enriching a flowing body of air to a predetermined temperature in a heating zone externally of the mass; introducing the heated air into said mass at spaced locations adjacent the upper portion of the mass and at substantially the same elevations thereby creating an indurating zone in the region of said spaced locations; measuring the temperature of said mass at spaced locations in said region; individually varying the flow of said heated air to each of said spaced locations in accordance with the temperature measurement adjacent that location; varying the volume of said air flowing to said heating zone in accordance with variations in demand for heated air adjacent the said locations; and correspondingly varying the quantity of fuel and primary air supplied to said external heating zone thereby maintaining the temperature of said heated air substantially constant.

16. The process of indurating in a shaft furnace discrete bodies of mineral solids having a small percentage of fuel incorporated therein which comprises: establishing a descending column of bodies of the solids in a gas traversable mass by charging initially substantially unheated bodies into the top of the furnace and discharging a corresponding volume of the heat treated bodies from the bottom at a rate such that the height of the mass of bodies remains substantially constant; passing a current of initially substantially unheated air through the mass from the bottom thereof; thermally enriching a second body of flowing air externally of the mass; introducing the heated air into said mass at spaced locations of substantially the same elevation above the bottom of the mass thereby creating an indurating zone in the region of said spaced locations; measuring the temperature of said mass at spaced locations in said region; varying the B. t. u. input to said mass at each of said spaced locations in accordance with the temperature measurement adjacent that location; measuring the temperature of the gases flowing from the top of said mass as an indication of the elevation of the said indurating zone in said mass; and controlling the quantity of air supplied to the bottom of said mass in accordance with the last-mentioned measurement; whereby the location and temperature of the indurating zone are regulated by the control of the air supplied to said mass.

17. The process of indurating in a shaft furnace discrete bodies of mineral solids having a small percentage of fuel incorporated therein which comprises: establishing a descending column of bodies of the solids in a gas traversable mass by charging initially substantially unheated bodies into the top of the furnace and discharging a corresponding volume of the heat treated bodies from the bottom at a rate such that the height of the mass of bodies in the furnace remains substantially constant; passing a current of initially substantially unheated air through the mass from the bottom thereof; thermally enriching a flowing body of air to a predetermined temperature in a heating zone externally of the mass by burning a combustible fluid in said flowing air; introducing the heated air into said mass at spaced locations of substantially the same elevation above the bottom of the mass thereby creating an indurating zone in the region of said spaced locations; measuring the temperature of said mass at spaced locations in said region; individually varying the flow of heated air to each of the said spaced locations in accordance with the temperature measurement adjacent that location; increasing the total volume of air supplied to said heating zone whenever the increased demand for heat adjacent one of said locations exceeds the maximum amount supplied adjacent that location before the total volume of heated air is increased; correspondingly increasing the quantity of combustible fluid supplied to said heating zone thereby maintaining the temperature of said heated air substantially constant; measuring the temperature of the air flowing from the top of said mass as an indication of the elevation of the said indurating zone in said mass; and controlling the quantity of air supplied to the bottom of said mass in accordance with the last-mentioned measurement; whereby the location of the indurating zone is regulated by the control of the air supplied to said mass.

References Cited in the file of this patent

UNITED STATES PATENTS

| Number | Name | Date |
|---|---|---|
| 2,194,713 | Mitchell | Mar. 26, 1940 |
| 2,345,067 | Osann | Mar. 28, 1944 |
| 2,417,049 | Bailey et al. | Mar. 11, 1947 |
| 2,470,996 | McGrath | May 24, 1949 |
| 2,518,996 | Peckham | Aug. 15, 1950 |
| 2,533,142 | Royster | Dec. 5, 1950 |
| 2,548,876 | DeJahn | Apr. 17, 1951 |
| 2,584,808 | Newhouse | Feb. 5, 1952 |
| 2,627,399 | De Vaney | Feb. 3, 1953 |
| 2,676,095 | De Vaney et al. | Apr. 20, 1954 |
| 2,696,432 | Davis | Dec. 7, 1954 |